United States Patent [19]

Ajanovic

[11] Patent Number: 5,758,166
[45] Date of Patent: May 26, 1998

[54] METHOD AND APPARATUS FOR SELECTIVELY RECEIVING WRITE DATA WITHIN A WRITE BUFFER OF A HOST BRIDGE

[75] Inventor: Jasmin Ajanovic, Folsom, Calif.

[73] Assignee: Intel Corporation, Santa Clara, Calif.

[21] Appl. No.: 650,166

[22] Filed: May 20, 1996

[51] Int. Cl.⁶ ............................................. G06F 13/362
[52] U.S. Cl. ............................................. 395/728; 395/293
[58] Field of Search ............................ 395/728, 293, 395/306, 299

[56] References Cited

U.S. PATENT DOCUMENTS

| | | | |
|---|---|---|---|
| 5,255,374 | 10/1993 | Aldereginia et al. | 395/393 |
| 5,455,915 | 10/1995 | Coke | 395/293 |
| 5,517,650 | 5/1996 | Bland et al. | 395/750 |
| 5,568,619 | 10/1996 | Blackledge et al. | 395/281 |
| 5,588,125 | 12/1996 | Bennett | 395/306 |
| 5,619,661 | 4/1997 | Crews et al. | 395/299 |
| 5,625,779 | 4/1997 | Solomon et al. | 395/293 |
| 5,640,520 | 6/1997 | Tetrick | 395/293 |

Primary Examiner—Jack B. Harvey
Assistant Examiner—Xuan M. Thai
Attorney, Agent, or Firm—Blakely, Sokoloff, Taylor & Zafman

[57] ABSTRACT

A computer system including amongst its components a host bus coupled to a processor, an intermediate (PCI) bus, an expansion (ISA or EISA) bus, a host bridge coupled between the host and intermediate busses, and an expansion bridge coupled between the intermediate and expansion busses, is disclosed. The host bridge incorporates data buffer management circuitry which examines a write request presented to the host bridge to determine whether the write request is to a device not coupled to the expansion bus. If the write request is to a device not coupled to the expansion bridge, the buffer management allows the write buffer to accept write data associated within the write request. If not, the buffer management circuitry prevents the write buffer from accepting the write data associated with the write request. The data buffer management circuitry may be configured to determine specifically whether the write request is to a graphics frame buffer.

22 Claims, 8 Drawing Sheets

METHOD AND APPARATUS FOR SELECTIVELY RECEIVING WRITE DATA WITHIN A WRITE BUFFER OF A HOST BRIDGE

FIELD OF THE INVENTION

The present invention pertains to the field of computer system communications. More particularly, the present invention relates to bus arbitration and communication systems in a computer system having a host bus, an intermediate bus and an expansion bus, and bus bridges connected between the various busses.

BACKGROUND OF THE INVENTION

In order to achieve performance advantages, while maintaining backwards compatibility (or legacy compatibility), many computer systems comprise a number of busses to which various devices having a common type of bus interface may be coupled. For example, a computer system may include a host bus (or local bus), to which a single processor, or even multiple processors, may be coupled. Such a host bus is closely associated with the processor(s) and is characterized by a high operating frequency. The computer system may also include an intermediate bus, which may be particularly suited to high speed data transfers as required by multi-media devices. An example of an intermediate bus is a Peripheral Components Interconnect (PCI) bus operated according to the Peripheral Components Interconnect (PCI) Local Bus Specification, Revision 2.1 published Jun. 1, 1995. The computer system may also include a "legacy" expansion bus. The term "legacy" describes expansion busses which conform to computer architecture standards which no longer represent cutting-edge technology, but which must still be supported due to the large number of peripheral devices in production and use which conform to these standards. Examples of such "legacy" expansion busses include Industry Standard Architecture (ISA) busses, Extended Industry Standard Architecture (EISA) busses and MicroChannel Architecture (MCA) busses. For the purposes of this specification, the term "expansion bus" shall be taken to include a "legacy expansion bus" as described above.

Computer systems incorporating host, intermediate and expansion busses also employ bus bridges to facilitate communication between devices coupled to the various busses. A host bridge is coupled between the host bus and the intermediate bus, and an intermediate bridge is coupled between the intermediate bus and the expansion bus. The bridges include circuitry for managing communication between the buses, and also for arbitrating between requests for access to, and control of, the various busses.

Arbitration units (or arbiters) are also incorporated within the bus bridges and arbitrate between requests for access to the various busses according to arbitration protocols specific to each type of bus. A bus bridge, such as the expansion bridge, may be regarded as a device which must itself request access to the intermediate bus on behalf of a device coupled to the expansion bus. Because of differences in the type of bus access granted to, and different capabilities of, devices on an intermediate bus and devices on an expansion bus, a number of problems have arisen in attempting to integrate busses operated according to substantially different protocols within a single computer system. One problem is the potential for deadlock which has been found to exist in certain circumstances. The term "deadlock" refers to a situation where a process or operation is unable to proceed because of, for example, an unresolvable conflict, or because a first operation is dependent upon the completion of a second operation, and vice versa. To avoid potential deadlock situations, a number measures have been introduced. An example of such a measure is to prevent the "posting" or writing of write data to a CPU-to-PCI write buffer when a device coupled to the expansion bus is performing an access operation to a device not on the expansion bus. The disabling of the CPU-to-PCI write buffer has the effect of reducing the level of concurrency at which various components with the computer system can operate. This in turn may negatively impact on the performance of the computer system.

SUMMARY OF THE INVENTION

According to a first aspect of the invention there is provided a method of selectively receiving write data within a write buffer of a host bridge in a computer system. The host bridge is coupled to an intermediate bus conforming to the PCI bus specification. The computer system includes an arbiter (for arbitrating between access requests to the PCI bus), an expansion bus and an expansion bridge, the expansion bridge being coupled between the intermediate bus and the expansion bus. The expansion bridge and bus conform to either the ISA or EISA standards.

The method begins with the receipt of an access request, at the arbiter, from the expansion bridge to access the intermediate (PCI) bus. The arbiter then arbitrates between the access request received from the expansion bridge and any other access requests. The expansion bridge is granted access to the intermediate bus if the request from the expansion bridge prevails in the arbitration. A write request is then received at the arbiter, whereafter a determination is made as to whether the write request is to a device not coupled to the (ISA or EISA) expansion bus. Write data associated with the write request is received in the write buffer, if the write request is to a device not coupled to the expansion bus. On the other hand, the receipt of the write data associated with the write request in the write buffer is prevented if the write request is to a device coupled to the expansion bus.

According to a second aspect of the invention there is provided a computer system including amongst its components a host bus coupled to a processor, an intermediate (PCI) bus, an expansion (ISA or EISA) bus, a host bridge coupled between the host and intermediate busses, and an expansion bridge coupled between the intermediate and expansion busses. The host bridge incorporates data buffer management circuitry which examines a write request presented to the host bridge to determine whether the write request is to a device not coupled to the expansion bus. If the write request is to a device not coupled to the expansion bridge, the buffer management allows the write buffer to accept write data associated within the write request. If not, the buffer management circuitry prevents the write buffer from accepting the write data associated with the write request. The data buffer management circuitry may be configured to determine specifically whether the write request is to a graphics frame buffer.

The invention extends a host bridge incorporating data buffer management circuitry as described above, and to the data buffer management circuitry itself. Other features of the present invention will be apparent from the accompanying drawings and from the detailed description which follows.

BRIEF DESCRIPTION OF THE DRAWINGS

The present invention is illustrated by way of example in the figures of the accompanying drawings, in which like references indicate similar elements and in which.

DETAILED DESCRIPTION

A method and apparatus for selectively receiving write data within a write buffer of a host bridge is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form.

Figure 1:
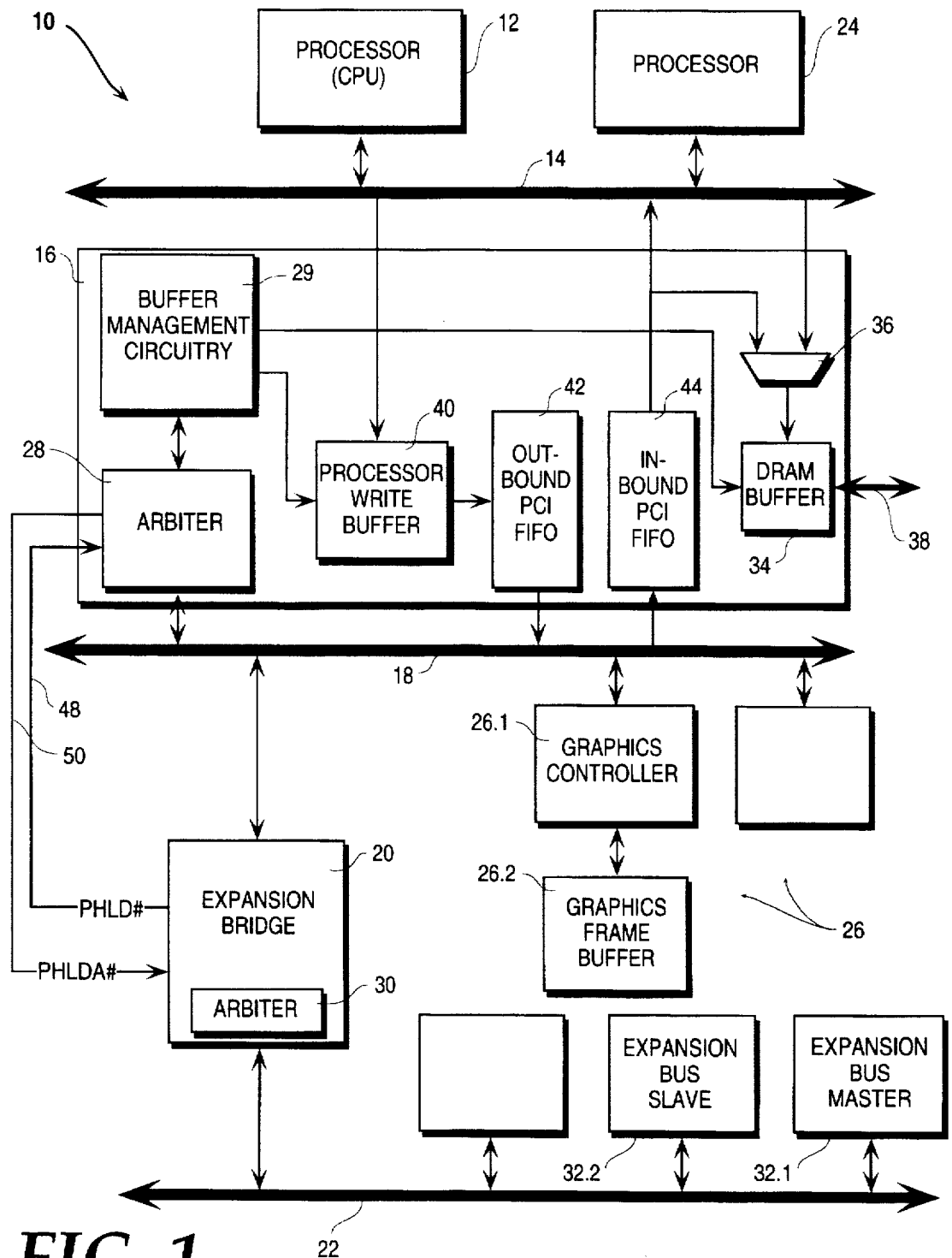
FIG. 1 is a block diagram of a computer system in which the present invention can be implemented.

Referring to FIG. 1, there is shown a computer system 10 in which the present invention can be implemented. The computer system 10 has as its primary components a processor 12, a host bus 14, a host bridge 16, an intermediate bus 18, an expansion bridge 20 and an expansion bus 22.

The processor 12 is provided to process signals, perform computations and control operations, and undertake any other tasks commonly performed by processors. Further processors, such as processor 24, may also be coupled to the host bus 14, and may be general purpose processors, such as the Pentium Pro® processor manufactured by Intel Corporation of Santa Clara, Calif., or special purpose processors, such as math co-processors. The host bridge 16 provides an interface between the host bus 14, and the intermediate bus 18. A plurality of bus agents 26 are coupled to the intermediate bus 18. In one embodiment, the intermediate bus 18 is a Peripheral Components Interconnect (PCI) bus, and the interfaces of the bus agents 26 accordingly all comply with the Peripheral Components Interconnect (PCI) Local Bus Specification, Revision 2.1 published Jun. 1, 1995. In this embodiment, the host bridge 16 is commonly termed a Host-to-PCI bridge. The bus agents 26 comprise input/output (I/O) devices or expansion bridges. Examples of bus agents include a graphics controller 26.1 and an associated graphics frame buffer 26.2, PCI bridges, Small Computer System Interface (SCSI) controllers and Local Area Network (LAN) controllers.

The host bridge 16 includes an arbiter 28 (also commonly referred to as an arbitration unit) which arbitrates between access requests received from the various competing bus devices (including bus agents 26, the expansion bridge 20 and the host bridge 16) for access to and control of the intermediate bus 18. For example, when a bus agent 26 requires access to the intermediate bus 18, it issues a request signal to the arbiter 28. The arbiter 28 accesses identification information which allows it to determine whether each bus device in the arbitration process is an expansion bridge, or another type of device. The arbiter 28 then arbitrates between the various access requests in accordance with an arbitration protocol (for example, the "fair rotating priority" protocol), and grants the intermediate bus 18 to the winning bus device.

The host bridge 16 performs a range of functions, including managing communications between the processor 12 and the intermediate bus 18, and arbitrating between requests for control of the intermediate bus 18. In the illustrated embodiment, the host bridge 16 also controls communication between a main memory (not shown), which comprises a number of rows of dynamic random access memory (DRAM), and the processor 12, and between main memory and the intermediate bus 18.

The host bridge 16 also incorporates a processor-to-intermediate bus write buffer 40 for receiving and buffering write postings which originate from processors coupled to the host bus 14 and which are destined for devices accessible via the intermediate bus 18. In one embodiment, the processor-to-intermediate bus write buffer 40 is termed a CPU-to-PCI write buffer. It will be appreciated that such write postings may be destined for devices coupled to the expansion bus 22, which are accessible through the expansion bridge 20. As such, the expansion bridge 20 may be simultaneously viewed as an intermediate bus slave (or target), and an expansion bus master. The processor-to-intermediate bus write buffer 40 is coupled to receive a signal from the buffer management circuit 29 to empty or "flush" its contents onto the intermediate bus 18 for receipt by a destination device, as will be described in further detail below. The host bridge 16 also includes an out-bound (first-in-first-out) FIFO queue buffer 42 which is coupled to receive write postings from the processor-to-intermediate bus write buffer 40, and to queue such postings before placing them on the intermediate bus 18. Similarly, an in-bound FIFO queue buffer 44 queues postings from the intermediate bus 18 destined for the host bus 14 or main memory.

The expansion bridge 20 is coupled between the intermediate bus 18 and the expansion bus 22, and operates to exchange data, control signals, and address signals between devices coupled to the respective busses 18 and 22. The expansion bridge 20 includes an arbiter 30 for arbitrating between requests from bus devices 32 coupled to the expansion bus 22. In one embodiment of the present invention, the expansion bus 22 and the bus devices 32 conform to the Industry Standard Architecture (ISA) standard, and arbitration is performed, and access to the expansion bus 22 granted, according to the rules of the ISA standard. In another embodiment, the expansion bus 22 and bus devices 32 conform to the Extended Industry Standard Architecture (EISA) standard. The bus devices 32 include expansion bus masters 32.1, expansion bus slaves 32.2, and other devices such as direct memory access (DMA) slaves.

System Concurrency

A degree of system concurrency is afforded by the computer system 10 as described above, this concurrency being provided primarily by the isolating capabilities of the host bridge 16 and the expansion bridge 20, the arbiters 28 and 30 and the buffering provided within the host bridge 16 and expansion bridge 20. The bridges 16 and 20 are effective to isolate the various busses from each other, and to allow concurrent operations between peer devices coupled to the various busses. The buffers within the host bridge 16 facilitate concurrency by allowing read and write data between the host bus 14 and intermediate bus 18 to be "posted" to, or temporarily stored within, the host bridge 16. Accordingly, the processor 12 is able, for example, to post write data to the processor-to-intermediate bus write buffer 40, and then proceed to perform another operation, while a bus agent 26 simultaneously performs a read operation from main memory. The arbiters 28 and 30 also operate under arbitration protocols which allow devices coupled to different busses interleaved access to shared resources, thus facilitating a further degree of concurrency. An example of such interleaved access is provided by the so-called "passive release" protocol, developed by Intel Corporation of Santa Clara, Calif., which is more fully described below.

Data Buffer Management Rules

In order to ensure data coherency in the computer system 10, a number of data buffer management policies have been implemented in host bridges employing buffers. The potential for data incoherency exists when, for example, data is being written from the processor 12 to a destination device via the intermediate bus 18. After the write data has been transferred from the processor 12, the processor 12 sets a valid flag in memory for other components to read. While the processor 12 may assume that a write operation to the destination device has been completed, and accordingly set a valid flag in memory to indicate completion of the write operation, a portion of the write data may in fact still be residing in the buffers of the host bridge 16. The possibility thus exists that another device may read the flag, and prematurely assume the data at an address to be valid. To avoid such scenarios, data management policies have been implemented which ensure that write operations are in fact completed before read operations are permitted. One such rule requires that processor-to-intermediate bus write buffers be emptied or "flushed" prior to allowing read operations to main memory.

The implementation of the above policy presents no problems when the device requesting access to the intermediate bus 18, to perform a read operation, conforms to the PCI standard. Under the PCI standard, devices are provided with a "retry" function, in terms of which the host bridge 16 can instruct the requesting device to "back-off", so as to allow the host bridge 16 to gain control of the intermediate bus 18, and flush the contents of the processor-to-intermediate bus write buffer 40 to the required destination. The PCI device will then "retry" to gain access to the intermediate bus 18 by re-issuing its request to the arbiter 28 on the host bridge 16.

Deadlock Problem

A potential deadlock situation, however, arises when the device requesting access to the intermediate bus 18 is coupled to an expansion bus 22, and conforms to either the ISA or EISA standard. The potential deadlock results from a conflict between the buffer management policy described above to ensure data coherency, and the policies governing the operation of ISA and EISA devices. More specifically, once an ISA bus master has been granted control of the expansion bus 22, the ISA bus master will not relinquish control of the expansion bus 22 until the ISA bus master has completed the operation or transaction for which control was requested. Once the arbiter 30 has granted an ISA bus master control of the expansion bus 22, for example, to perform a main memory read operation, the expansion bridge 20 will then request access to the intermediate bus 18 on behalf of the ISA bus master. Should the arbiter 28 then grant control of the intermediate bus 18 to the expansion bridge 20, the data buffer management circuitry 29 may determine that a flush of the processor-to-intermediate bus write buffer 40 is required to maintain data coherency. It is conceivable that the data in the processor-to-intermediate bus write buffer 40 is destined for a device coupled to the expansion bus 22. Accordingly, a deadlock situation now arises, as the host bridge 16 requires access to the expansion bus 22 to complete the flush, but ISA policy prevents the ISA bus master from relinquishing control until the read operation it initiated is complete.

Figure 2A:
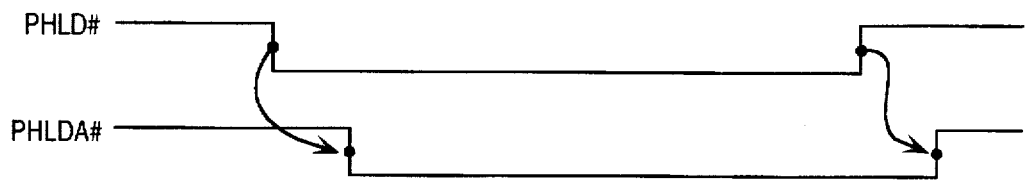
FIGS. 2A and 2B are timing diagrams showing the relationship between handshaking signals used in an intermediate bus transfer protocol between a host bridge and an expansion bridge of the computer system shown in FIG. 1.

To avoid the deadlock problem described above in an efficient and inexpensive manner, a modified protocol for handling access requests to the intermediate bus 18 from the expansion bridge 20, on behalf of an ISA bus master, has been developed. In terms of this protocol, the expansion bridge 20 issues an access request to the arbiter 28 by asserting a PHLD# signal 48. The # designation following each signal indicates that the signal is active low, and is accordingly asserted by a low transition. When the arbiter 28 receives the PHLD# request, it identifies the request as originating from the expansion bridge 20. The request from the expansion bridge 20 is then arbitrated by the arbiter 28 in accordance with predetermined arbitration rules, such as fair rotating priority. Should the expansion bridge 20 win the arbitration, the host bridge 16 then flushes the contents of the processor-to-intermediate bus write buffer 40 before granting the expansion bridge 20 access to the intermediate bus 18, access being granted by asserting a PHLDA# signal 50. Once the contents of the processor-to-intermediate bus write buffer 40 have been emptied or flushed, the expansion bridge 20 is given access to the intermediate bus 18. FIG. 2A is a timing diagram that illustrates the relationship between the PHLD# signal and the PHLDA# signal, as described above.

In order to prevent the possibility of deadlock during the entire period during which the expansion bridge 20 is accessing the intermediate bus 18 (i.e. before the access transaction from the expansion bridge 20 has been completed), the processor-to-intermediate bus write buffer 40 is also disabled to prevent the posting of write data thereto. While this measure effectively prevents the potential for a deadlock problem, it will be appreciated that by disabling the processor-to-intermediate bus write buffer 40, the concurrency, and consequently the performance, of the computer system 10 may be adversely effected.

Passive Release

It will further be appreciated that, in a computer system employing the PHLD#/ PHLDA# protocol described above, when control of the intermediate bus 18 is granted to the expansion bridge 20, the latencies and bandwidth of the expansion bus 22 are in fact being transposed onto the intermediate bus 18. In one embodiment, it is conceivable that an extremely slow ISA bus master may occupy the expansion bus for a long and non-deterministic period. As stated above, an ISA bus master is not able to relinquish control of an ISA bus under completion of the relevant bus access operation, and the expansion bridge 20 will thus not de-assert the PHLD# signal for the duration of the access by the ISA bus master. To address this problem, and to facilitate a higher degree of system concurrency, a modified arbitration signaling protocol was developed, and implemented as the so-called "passive release" protocol. This protocol is fully described in U.S. patent application Ser. No. 08/366, 964 to Hayek et al., entitled "AN ARBITRATION SIGNALING MECHANISM TO PREVENT DEADLOCK AND GUARANTEE ACCESS TIME LATENCY FOR AN EXPANSION BRIDGE", filed Dec. 30, 1994, and assigned to Intel Corporation of Santa Clara, Calif.

Figure 2B:
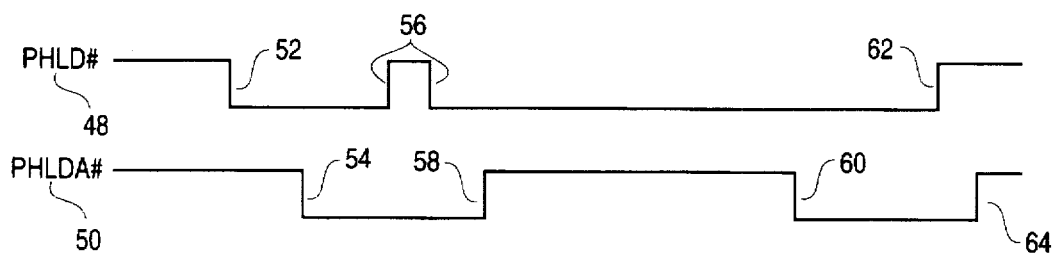

FIG. 2B shows a timing diagram illustrating the relationship between the PHLD# signal 48 and the PHLDA# signal 50 under the passive release protocol. Referring to FIG. 2B, the expansion bridge 20 requests access to the intermediate bus 18 by driving the PHLD# signal 48 low at 52. The arbiter 28 then arbitrates between competing requests as described above. Should the expansion bridge 20 win the arbitration, the buffer management circuitry 29 empties the processor-to-intermediate bus write buffer 40, before the arbiter 28 grants the expansion bridge 20 access to the intermediate bus 18 by driving the PHLDA# signal low, as shown at 54. The "passive release" protocol differs from the protocol illustrated in FIG. 2A in that the expansion bridge 20 indicates to the arbiter 28 that it is willing to passively (or temporarily) release control of the intermediate bus 18 by a short, one-cycle de-assertion of the PHLD# signal 48, as indicated at 56. In response, the arbiter 28 accepts the passive release by de-asserting the PHLDA# signal 50, as indicated at 58. The arbiter 28 is now able, if necessary, temporarily to grant control of the intermediate bus 18 to another bus agent 26, thereby enhancing the concurrency of the system, and allowing other bus agents 26 to take advantage of latencies in the access cycle of an ISA device to the intermediate bus 18. As the PHLD# signal 48, however, remains asserted by the expansion bridge 20, it can again be granted bus access by the arbiter 28, as indicated by the assertion of the PHLDA# signal at 60. When the expansion bridge 20 has completed its access cycle, it will then de-assert the PHLD# signal 48, as shown at 62, in response to which the arbiter 28 will then de-assert the PHLDA# signal 50, as shown at 64.

However, to avoid the deadlock problem described above, the data buffer management circuitry 29 requires that the processor-to-intermediate bus write buffer 40 be disabled during the entire access cycle of the expansion bridge 20 (i.e. prior to completion of an access transaction initiated by the expansion bridge 20) so as to prevent the processor expansion buffer 40 from receiving write data from the host bus 14. Thus, while the passive release protocol provides a substantial advantage in allowing the intermediate bus 18 to be released to other devices, and thereby allowing intermediate bus 18 activities to occur between each ISA device data phase, the processor-to-intermediate bus write buffer 40 still suffers the drawback of being unable to accept processor write postings when the passive release protocol is engaged. This results in a loss of system concurrency as highlighted above.

The present invention proposes utilizing the above-described passive release protocol, data buffer management circuit 29 and information contained in a processor write posting to achieve an increased level of concurrency within a computer system.

As explained above, the possibility of a deadlock arises when data stored in the processor-to-intermediate bus write buffer 40 is destined for a device coupled to the expansion bus 22, and the expansion bridge 20 gains control of the intermediate bus 18, for example, to perform a read operation on behalf of an ISA bus master or direct memory access (DMA) device. Because the ISA bus master does not have the capability to temporarily relinquish bus control, and then "retry" for bus control later, the ISA bus master operation precludes the flushing of the contents of the processor-to-intermediate bus write buffer 40 to a location on the expansion bus 22. However, a number of processor write postings that the processor 12 may desire to make, when the write buffer 40 is disabled, may in fact be to locations that do not require access to the expansion bus 22. Accordingly, the concurrency that would result from allowing these writing postings from the processor 12 (or 24) to be buffered in write buffer 40 is being sacrificed for the sake of those write postings which are destined for a location on the expansion bus 22. The present invention proposes a method and apparatus for allowing write posting from the processor 12 (or 24), and destined for a device not connected to the expansion bus 22, to be posted to a processor-to-intermediate bus write buffer 40. Thus, according to the invention, a processor-to-intermediate bus write buffer is selectively disabled only for processor-generated write posting destined for locations on devices coupled to the expansion bus 22.

Figure 3:
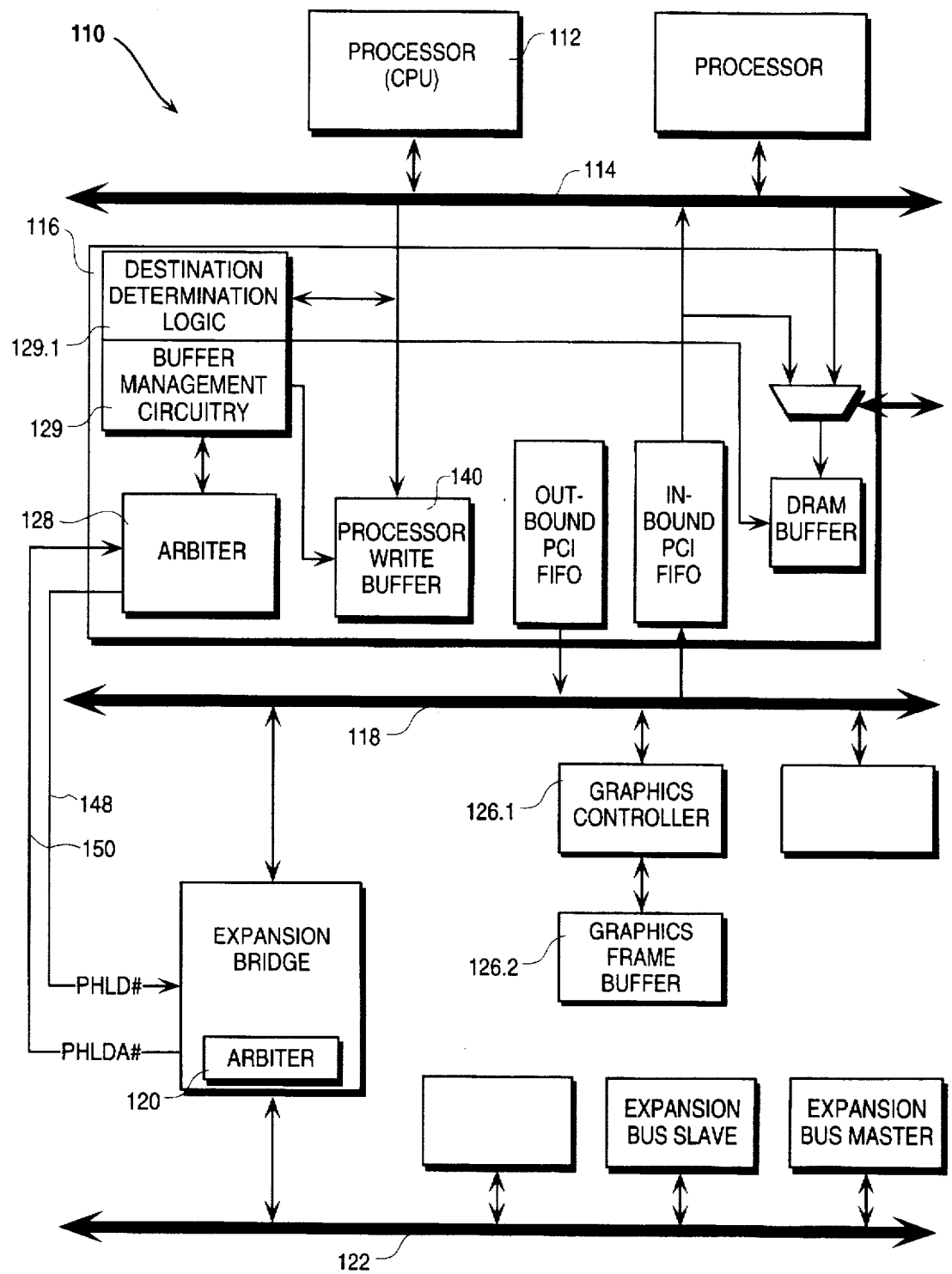
FIG. 3 is a block diagram of a first embodiment of computer system, according to the present invention, for selectively receiving write data within a write buffer of a host bridge.

Turning to FIG. 3, there is shown a computer system 110 incorporating a first embodiment of the present invention. The computer system 110 has as its primary components a processor 112, a host bus 114, a host bridge 116, an intermediate bus 118, an expansion bridge 120 and an expansion bus 122.

The host bridge 116 differs substantially from that shown in FIG. 1 in that buffer management circuitry 129 includes destination determination logic 129.1 which, when the processor-to-intermediate bus write buffer 140 is disabled (for example during an expansion bridge access period), examines a write transaction request from the processor 112 to determine whether the write transaction is destined for a location on the intermediate bus 118. If it is determined that the relevant write data is destined for a location on the intermediate bus 118, the buffer management circuitry 129 grants the write request from the processor 112, and the write data from the processor 112 is accepted within (or posted to) the buffer 140. Alternatively, should the destination determination logic 129.1 determine that the write data is not destined for a location on the intermediate bus 118, the buffer management circuitry 129 denies the write request to the processor-to-intermediate bus write buffer 140.

In the first embodiment, the processor 112 incorporates logic which allocates attributes, or identifiers, to certain programmable memory ranges. Memory attribute information is included in information transmitted from the processor 112 to the host bridge 116 during the request phase of a processor write transaction. For example, the Pentium Pro® processor, manufactured by Intel Corporation of Santa Clara, Calif., includes a plurality of memory type range registers, which specify the types of memory that occupy various physical address ranges, and allocate attribute information to each of these memory types. The attributes of the various types of memory define the cacheability of, and access rights to, these memory ranges. This attribute information is included with write request information transmitted from the Pentium Pro® processor. The inclusion of memory range attribute information is an innovation which is particularly useful in processors performing out-of-order and speculative instruction execution, as this feature allows certain memory ranges to be shielded from out-of-order and speculative accesses in order to preserve data coherency. The Pentium Pro® processor identifies five primary memory types, namely:

1. Uncacheable (UC) memory;
2. Uncacheable, speculatable, write-combining (USWC) memory;
3. Write-through (WT) memory;
4. Write-protected (WP) memory; and
5. Writeback (WB) memory.

The USWC attribute is particularly suited to enhancing processor 112 access to a graphics frame buffer 126.2, as this attribute facilitates the combining, within the processor 112, of multiple individual writes into a longer burst write sequence. Attribute information within a write request information is receivable and identifiable by the destination determination logic 129.1. The destination determination logic 129.1 may accordingly be able to use this attribute information to identify processor write requests which are directed towards specific devices within the computer system 110. In the computer system 110 illustrated in FIG. 3, the graphics frame buffer 126.2 is shown coupled to a graphics controller 126.1, which is in turn coupled to the intermediate bus 118. In an embodiment where the intermediate bus 118 is a PCI bus, the graphics controller 126.1 and the graphics frame buffer 126.2 will commonly be coupled to the intermediate bus 118 as the intermediate bus 118 facilitates superior data transfer rates, which is highly desirable when processing graphics data. Accordingly, it will be appreciated that, for a computer system configured as shown in FIG. 3, the destination determination logic 129.1, by examining the appropriate attribute information, is able to ascertain during the request phase of a processor write transaction whether the transaction targets a USWC memory range. As described above, the buffer 140 is selectively disabled during an access period by the expansion bridge 120. In accordance with the present invention, if the destination determination logic 129.1 determines that a write request targets the USWC memory range, the buffer management circuitry 129 issues a grant signal in response to the write request from the processor 112. The processor write data is then receivable in the processor-to-intermediate bus write buffer 140. If the processor write transaction is identified as being to a memory range other than the USWC range, the write transaction is either retried or stalled, and the disablement of the buffer 140 is maintained. Accordingly, the invention provides a manner of "bypassing" the disablement of the buffer 140 during an expansion bus 122 access period.

Once write data (also termed a "write posting") has been received within the buffer 140, the expansion bus 122 may again request control of the intermediate bus 118, after having passively released the intermediate bus 118 for access by other devices. In this case, the request will again be subject to arbitration as described above. Should the expansion bridge 120 win the arbitration, the buffer management circuitry 129 first causes the write data posted to the buffer 140 to be emptied, or flushed, to the USWC memory range (i.e. the graphics frame buffer 126.2). As the write data is being flushed to a device on the intermediate bus 118, the deadlock problem does not arise, and the possibility of data incoherency is averted. Having completed the flush operation, the arbiter 128 grants control of the intermediate bus 118 to the expansion bridge 120 by asserting the PHLDA# signal 150. After the expansion bridge 120 has completed its access to the intermediate bus 118, it de-asserts the PHLD# signal 148, in response to which the arbiter 128 de-asserts the PHLDA# signal 150. The processor-to-intermediate bus write buffer 140 is then globally enabled, and normal posting operations resume.

Figure 4:
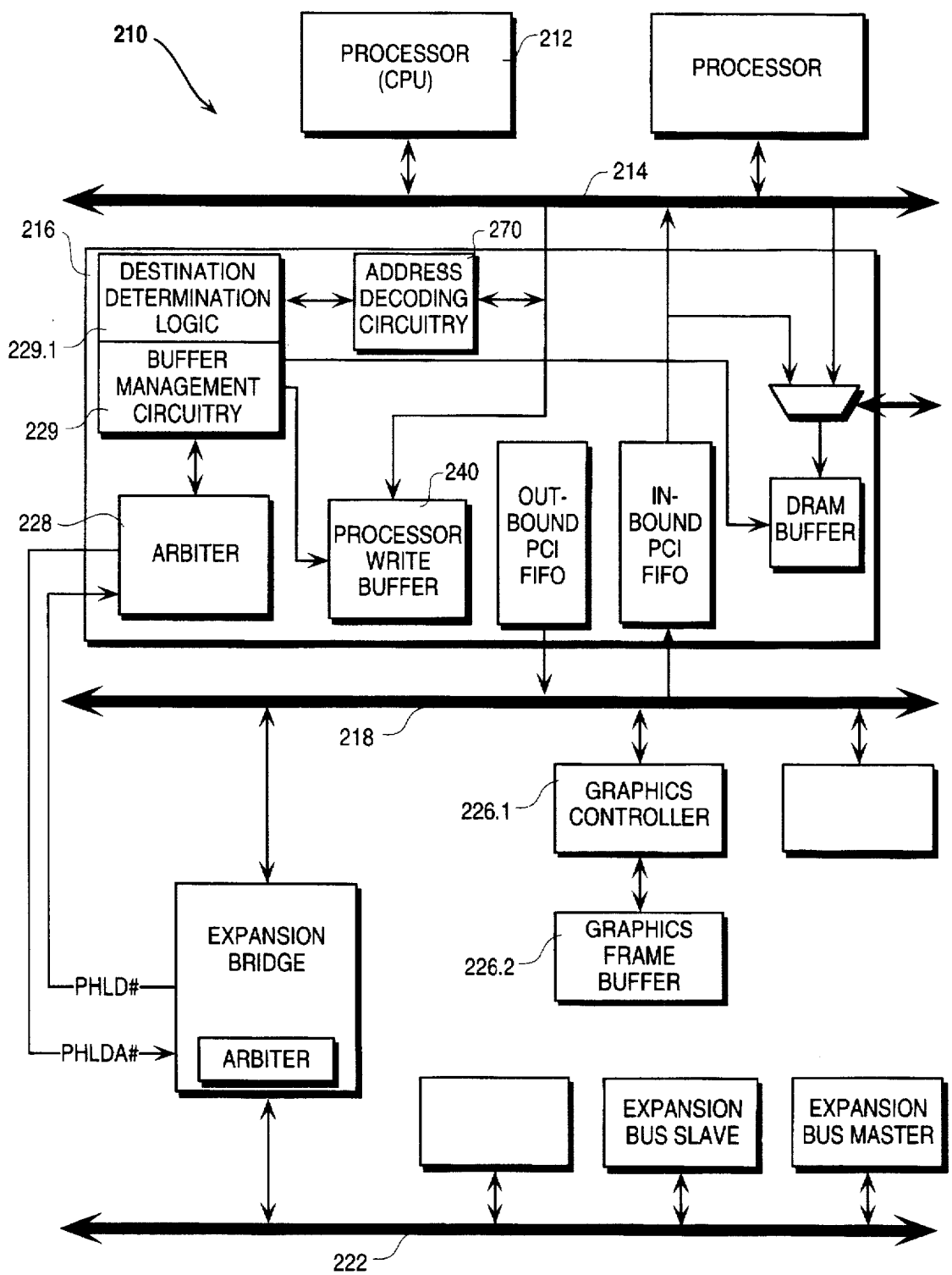
FIG. 4 is a block diagram of a second embodiment of computer system, according to the present invention, for selectively receiving write data within a write buffer of a host bridge.

Referring now to FIG. 4, there is shown a second implementation of the present invention in a computer system 210. Unlike the processor 112 of the computer system 110 of FIG. 3, the processor 212 does not have logic for allocating attributes to certain memory ranges. For example, the processor 212 may be a Pentium® processor, or a predecessor thereof.

Accordingly, the computer system 210 includes a host bridge 216 incorporating address decoding circuitry 270 which is programmable to identify predetermined address ranges as being associated with various devices. For example, the address decoding circuitry 270 identifies an appropriate memory range as being allocated to a graphics frame buffer 226.2. The address decoding circuitry 270 is coupled to provide information, identifying a write request from the processor 212 as targeting a specific device, to destination determination logic 229.1, which in turn determines whether a device targeted by a write request is coupled to an expansion bus 222, or to any other bus. If the targeted device is determined to be on the expansion bus 222, the buffer management circuitry 229 denies the write request from the processor 212. Alternatively, should the destination determination circuitry 229.1 identify the write request as targeting a device coupled to an intermediate bus 218, the buffer management circuitry 229 enables the buffer 240, and the appropriate write data is posted to a processor-to-intermediate bus write buffer 240. In one embodiment, the write request from the processor 212 is to the graphics frame buffer 226.2, and the address decoding circuitry 270 is configured to identify the graphics frame buffer 226.2 as being the targeted device from address information included in the write request from the processor 112. It will also be appreciated that the address decoding circuitry 270 need not be located within the host bridge 216, and could be located anywhere intermediate the processor 212 and the destination determination circuitry 229.1.

FIGS. 5A to 5D show flow-charts illustrating a method of selectively disabling a write buffer in a host bridge to prevent a potential deadlock situation, the method being implemented during an access period by an expansion bridge.

Figure 5A:
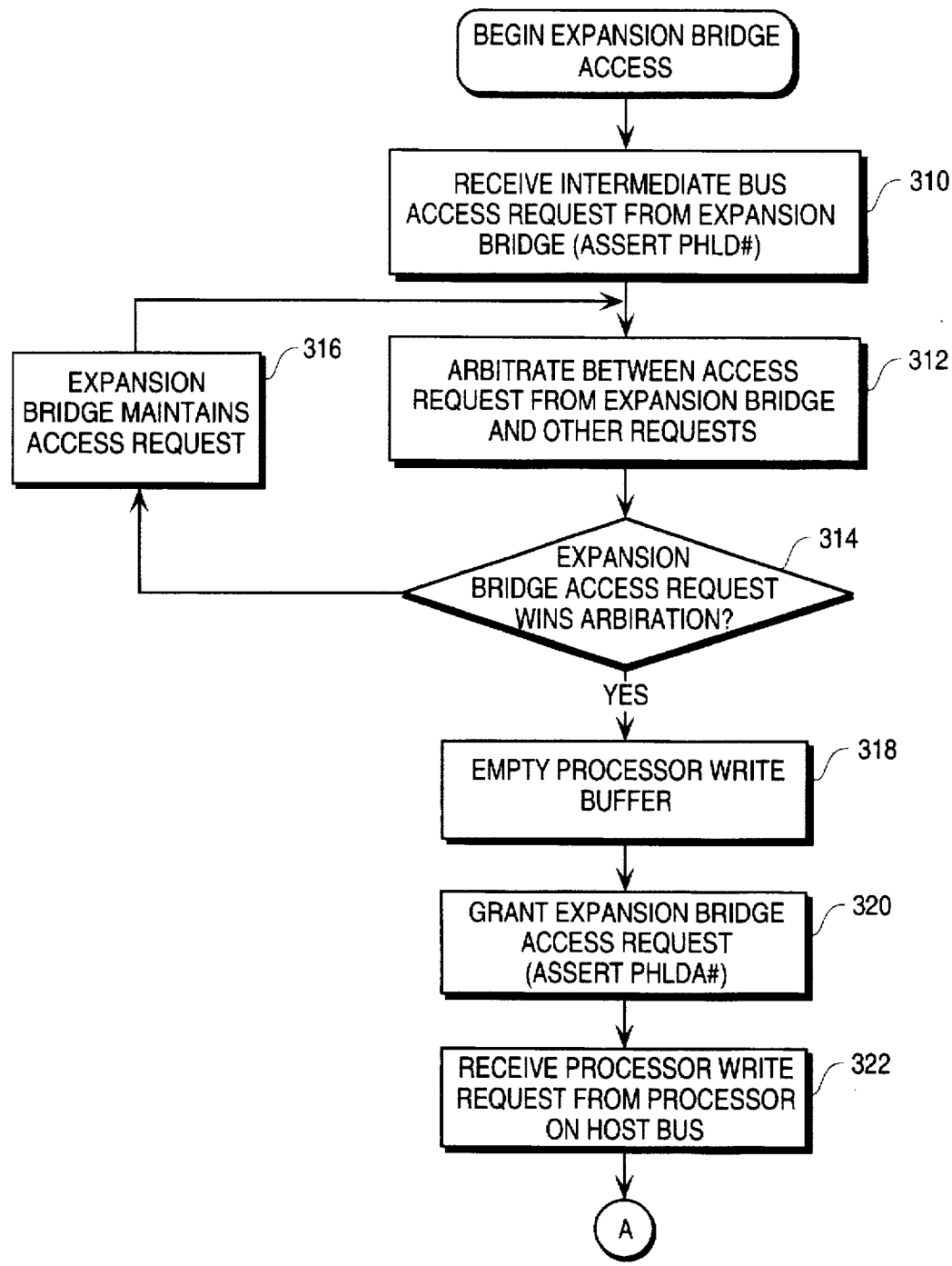
FIGS. 5A to 5D are flow charts illustrating a method, according to the present invention, of selectively disabling a write buffer in a host bridge of a computer system, so as to prevent a deadlock situation.

Referring firstly to FIG. 5A, the method begins at step 310 with a request from the expansion bridge 120 for control of the intermediate bus 118, the request being communicated to the arbiter 128 within the host bridge 116 by the assertion of the PHLD# signal 148. The arbiter 128 then arbitrates between the access request from the expansion bridge 120 and access requests for other intermediate bus masters at step 312. At step 314, it is determined whether the expansion bridge 120 has won the arbitration. If the expansion bridge 120 loses the arbitration, the access request by the expansion bridge 120 is maintain by the bridge 120 for arbitration in the next arbitration cycle, as indicated at step 316. However, should the expansion bridge 120 win the arbitration, the method proceeds to step 318, where the buffer management logic 129 within the host bridge 116 performs a processor-to-intermediate bus write buffer 140 flush or emptying for reasons explained above. Once the flush of the buffer 140 has been completed, the arbiter 128 grants the expansion bridge 120 access to the intermediate bus 118, as indicated at step 320, by asserting the PHLDA# signal 150.

Figure 5B:
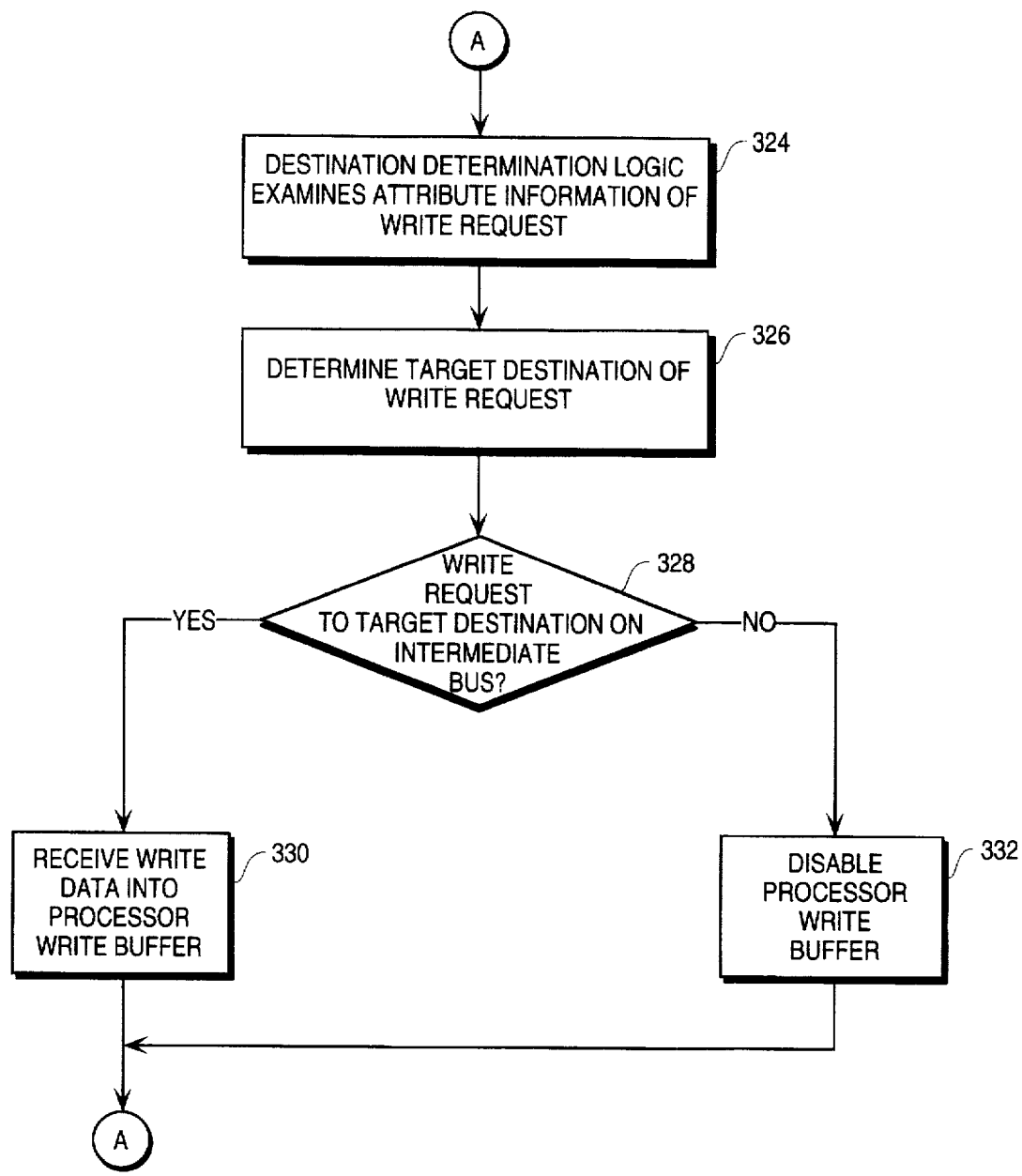

At step 322, a processor write request is presented to the host bridge 116. Referring now to FIG. 5B, the destination determination logic 129.1 within the buffer management circuit 129 examines the attribute information presented with the write request at step 324. At step 326, the logic 129.1 determines the target destination of the write request. At step 328 it is determined whether the target destination is on the intermediate bus 118. More specifically, the logic 129.1 determines whether the write request targets the USWC memory range. If it is determined at step 328 that the write request targets the USWC memory range, the write request is granted and the appropriate write data is posted to the processor-to-intermediate bus write buffer 140 at step 330. Alternatively, if it is determined at step 328 that the write request does not target the USWC memory range, then the write request from the processor 112 is denied, and the buffer 140 disabled at step 332.

Figure 5C:
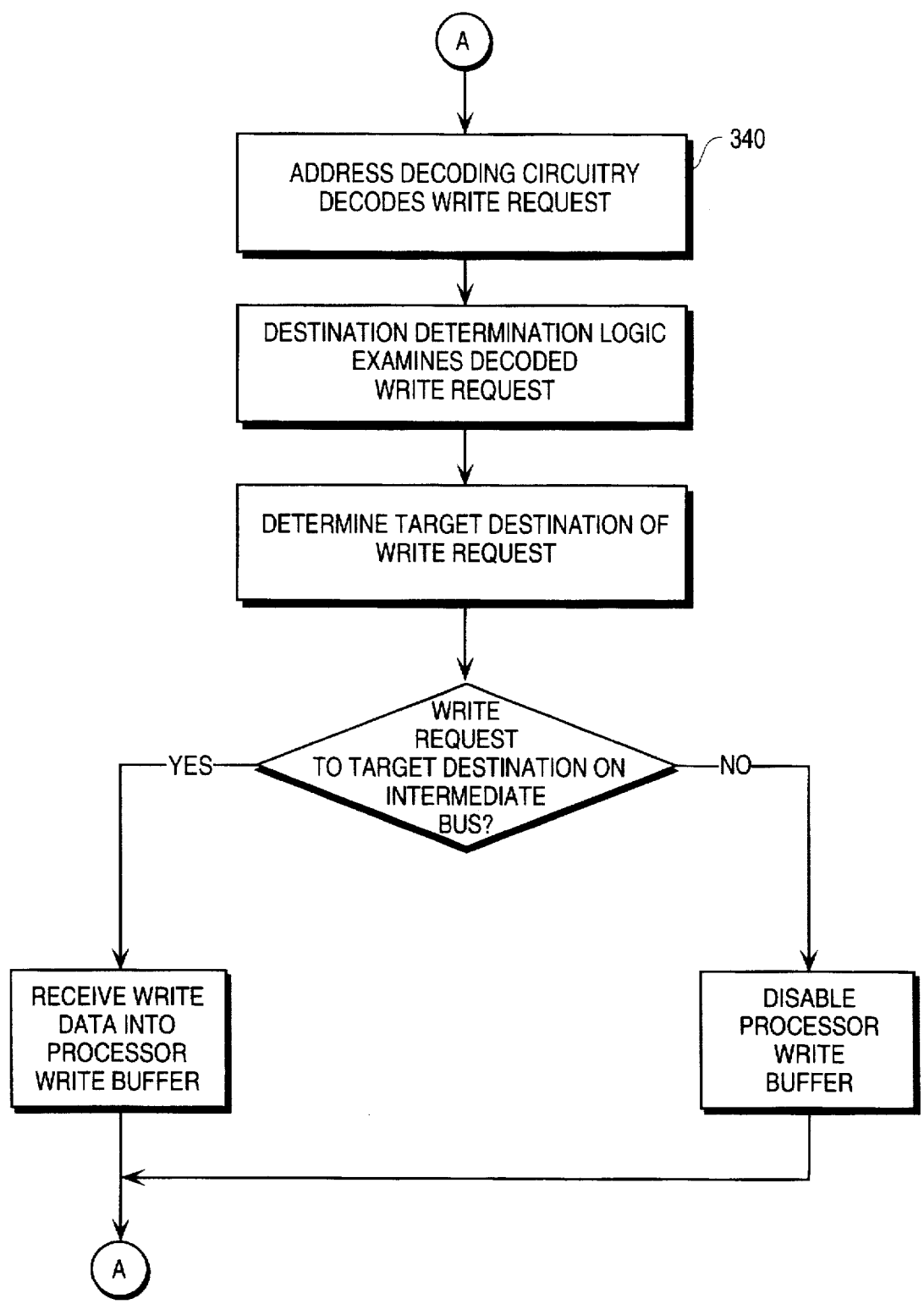

FIG. 5C illustrates a variation of the steps illustrated in FIG. 5B, and differs only in the inclusion of step 340, at which the address decoding circuitry 270 shown in FIG. 4 decodes information contained in the write request to provide an indication of the target location of the write request. For example the circuitry 270 could decode the write request from the processor to provide an indication that the write request is to the graphics frame buffer 226.2. The additional step 340 is necessary in a computer system where the processor 212 does not itself provide attribute information which can be examined by the destination determination logic 229.1 to determine the target destination of the write request.

Figure 5D:
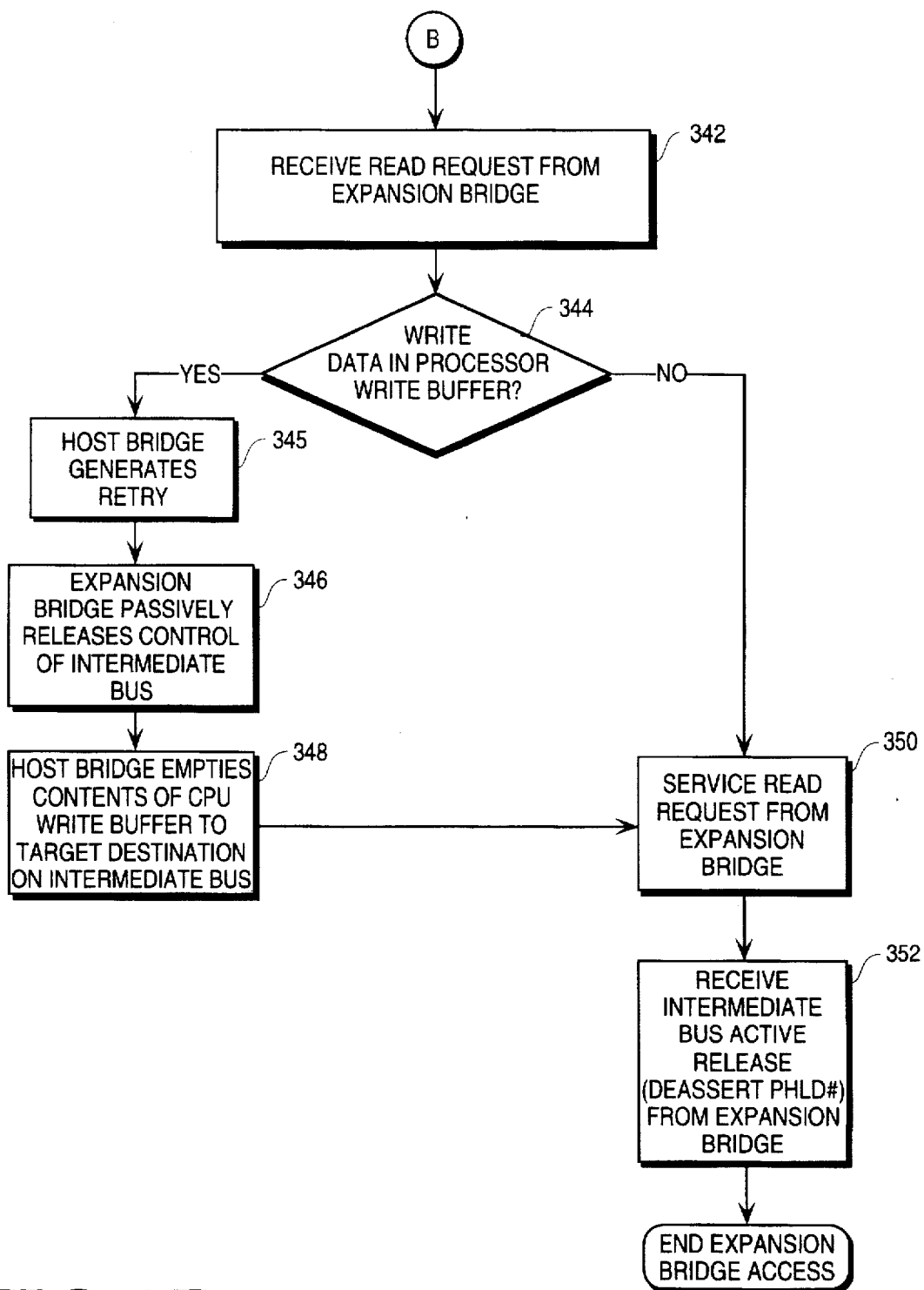

Turning now to FIG. 5D, the method proceeds to step 342, where a read request is received from the expansion bridge 120.

At step 344, a determination is made as to whether write data is residing in the processor-to-intermediate bus write buffer 140. If there is data in the buffer 140, the host bridge 116 retries to obtain control of the intermediate bus 118 at step 345. The expansion bridge 120 then passively releases control of the intermediate bus 118 at step 346. It will be appreciated from the discussion above that the expansion bridge 120 may already have passively released the intermediate bus 118 at any time subsequent to having been granted access thereto. Once the intermediate bus 118 has been passively released, the host bridge 116 is able to empty, or flush, the contents of the buffer 140 to the target destination, such as the graphics frame buffer 126.2, on the intermediate bus 118. The read request received from the expansion bridge 120 is then serviced at step 350. If it is determined at step 344 that the buffer 140 is empty, then the method proceeds directly to step 350. The access transaction having been serviced, the expansion bridge 120 then de-asserts the PHLD# signal. In response to the de-assertion of the PHLD# signal, the PHLDA# signal is de-asserted by the host bridge 116, at step 352, to thereby end the expansion bridge access.

The present invention also envisages that, in the event that the processor-to-intermediate bus write buffer 140 is found to contain write data destined for a target location not on the expansion bus 122 prior to performing step 318 in FIG. 5A, then step 318 can be bypassed as this data can safely be flushed to the relevant target location, once the intermediate bus 118 has been passively released, without raising the possibility of a deadlock scenario.

The present invention is particularly advantageous in that it allows for selective disabling of a processor-to-intermediate bus write buffer during the access period of an expansion bridge, as opposed to the global disabling of the write buffer that was previously enforced. Accordingly, the invention provides a higher level of concurrency within a computer system. The invention is particularly suited to enhancing processor access to a graphics frame buffer, which is commonly located on an intermediate bus, such as a PCI bus. More specifically, the invention is particularly suited to allowing postings, destined for a graphics frame buffer, to be received within a processor-to-intermediate bus write buffer in a host bridge, when the buffer is unable to accept other postings because of the deadlock problem discussed above.

Thus, a method and apparatus for selectively receiving write data within a write buffer of a host bridge has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of selectively receiving write data within a write buffer of a host bridge in a computer system, the host bridge being coupled to an intermediate bus of the computer system, and the computer system including an arbiter for arbitrating between access requests to the intermediate bus, an expansion bus and an expansion bridge coupled to the intermediate bus and the expansion bus, the method comprising the steps of:

receiving a write request at the arbiter subsequent to commencement and prior to completion of an access transaction by the expansion bridge utilizing the intermediate bus;

determining whether the write request received at the arbiter is to a device not coupled to the expansion bus;

prior to completion of the access transaction by the expansion bridge, receiving write data associated with the write request in the write buffer, if the write request is to a device not coupled to the expansion bus; and prior to completion of the access transaction by the expansion bridge, preventing the receipt of the write data associated with the write request in the write buffer, if the write request is to a device coupled to the expansion bus.

2. The method of claim 1 wherein the step of determining comprises determining whether the write request is to a device coupled to the intermediate bus.

3. The method of claim 1 including the step of arbitrating between an access request receive from the expansion bridge and an access request from a further intermediate bus master, and commencing the access transaction by the expansion bridge utilizing to the intermediate bus if the access request from the expansion bridge prevails in the arbitration.

4. The method of claim 3 including the step of emptying the write buffer of the host bridge prior to commencing the access transaction by the expansion bridge utilizing the intermediate bus.

5. The method of claim 1 including the step of actively releasing the intermediate bus from access by the expansion bridge when the expansion bridge has completed the access transaction.

6. The method of claim 5 including the step of passively releasing the intermediate bus from access by the expansion bridge prior to completion of the access transaction, the passive release relinquishing exclusive access by the expansion bridge to the intermediate bus prior to completion of the access transaction.

7. The method of claim 6 including the steps of:

receiving a read request at the arbiter prior to completion of the access transaction;

passively releasing the intermediate bus from access by the expansion bridge; and emptying the write data from the write buffer to the location on the device not coupled to the expansion bus.

8. The method of claim 1 wherein the determining step comprises the step of determining whether the write request is to a memory range associated with the device not coupled to the expansion bus.

9. The method of claim 8 wherein the determining step comprises the step of examining attribute information included in the write request and identifying the memory range.

10. (Amended) The method of claim 8 wherein the determining step comprises the step of decoding address information included in the write request to identify the memory range.

11. The method of claim 8 wherein the determining step comprises the step of determining whether the write request is to a graphics frame buffer.

12. A computer system comprising:

a processor;

a host bus coupled to the processor;

an intermediate bus;

an expansion bus;

a host bridge coupled between the host and intermediate busses, the host bridge including a write buffer to receive write data, and data buffer management circuitry; and an expansion bridge coupled between the intermediate and expansion busses;

the data buffer management circuitry to determine subsequent to commencement and prior to completion of an access transaction by the expansion bridge utilizing the intermediate bus, whether a write request presented to the host bridge is to a device not coupled to the expansion bus, and, if so, to allow the write buffer to accept write data associated with the write request and, if not, to prevent the write buffer from accepting the write data associated with the write request.

13. The computer system of claim 12 wherein the data buffer management circuitry is configured to determined whether the write request is to a device coupled to the intermediate bus.

14. The computer system of claim 12 wherein the data buffer management circuitry is configured to determine whether the write request is to a memory range associated with the device not coupled to the expansion bus.

15. The computer system of claim 14 wherein the data buffer management circuitry is configured to determine whether the write request is to a graphics frame buffer.

16. The computer system of claim 12 wherein the expansion bridge is configured temporarily to release the intermediate bus to access by a further intermediate bus master before the expansion bus has completed the access transaction.

17. The computer system of claim 16 wherein the data buffer management circuitry is configured to empty the write data to a location on the device not coupled to expansion bus when the intermediate bus is temporarily released by the expansion bridge, and on receipt by the host bridge of a read request.

18. A host bridge for use in a computer system comprising a processor, a host bus, an intermediate bus, and an expansion bus, the host bridge comprising:

a write buffer coupled to receive write data from the processor; and data buffer management circuitry configured to determine, subsequent to commencement and prior to completion of an access transaction by an expansion bridge utilizing the intermediate bus, whether a write request presented to the host bridge is to a device not coupled to the expansion bus, and, if so, to allow the write buffer to accept write data associated with the write request and, if not, to prevent the write buffer from accepting the write data associated with the write request.

19. The host bridge of claim 18 wherein the data buffer management circuitry is configured to determined whether the write request is to a device coupled to the intermediate bus.

20. The host bridge of claim 18 wherein the data buffer management circuitry is configured to determine whether the write request is to a memory range associated with the device not coupled to the expansion bus.

21. The host bridge of claim 20 wherein the data buffer management circuitry is configured to determine whether the write request is to a graphics frame buffer.

22. A data buffer management circuit for use with a write buffer in a host bridge coupled between a host bus and an intermediate bus, the data buffer management circuit being configured to determine, subsequent to commencement and prior to completion of an access transaction by an expansion bridge utilizing the intermediate bus, whether a write request presented to the host bridge is to a device coupled to the intermediate bus, and, if so, to allow the write buffer to accept write data associated with the write request and, if not, to prevent the write buffer from accepting the write data associated with the write request.

* * * * *